United States Patent
Chun et al.

(10) Patent No.: US 10,736,024 B2
(45) Date of Patent: Aug. 4, 2020

(54) SYSTEM INFORMATION TRANSMISSION METHOD AND BASE STATION, AND SYSTEM INFORMATION RECEPTION METHOD AND USER EQUIPMENT

(71) Applicant: LG ELECTRONICS INC., Seoul (KR)

(72) Inventors: Sungduck Chun, Seoul (KR); Jaehyun Kim, Seoul (KR); Taehun Kim, Seoul (KR); Hyunsook Kim, Seoul (KR); Sangmin Park, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/086,293

(22) PCT Filed: Mar. 30, 2017

(86) PCT No.: PCT/KR2017/003481
§ 371 (c)(1),
(2) Date: Sep. 18, 2018

(87) PCT Pub. No.: WO2017/171427
PCT Pub. Date: Oct. 5, 2017

(65) Prior Publication Data
US 2019/0110243 A1     Apr. 11, 2019

Related U.S. Application Data

(60) Provisional application No. 62/341,082, filed on May 25, 2016, provisional application No. 62/315,028, filed on Mar. 30, 2016.

(51) Int. Cl.
*H04W 48/00*     (2009.01)
*H04W 48/16*     (2009.01)
(Continued)

(52) U.S. Cl.
CPC .......... *H04W 48/16* (2013.01); *H04W 48/08* (2013.01); *H04W 48/18* (2013.01); *H04W 76/10* (2018.02);
(Continued)

(58) Field of Classification Search
CPC ..... H04W 48/16; H04W 48/08; H04W 48/18; H04W 48/12; H04W 76/27; H04W 76/10; H04W 88/10
See application file for complete search history.

(56) References Cited

U.S. PATENT DOCUMENTS 10,455,483 B2 * 10/2019 Lee .................. H04W 48/16
2005/0090255 A1   4/2005 Kuchubhotla et al.
(Continued)

FOREIGN PATENT DOCUMENTS

EP     1104975     6/2001
KR     101033405     5/2011
(Continued)

OTHER PUBLICATIONS

PCT International Application No. PCT/KR2017/003481, Written Opinion of the International Searching Authority dated Jul. 11, 2017, 19 pages.
(Continued)

*Primary Examiner* — Khai M Nguyen
(74) *Attorney, Agent, or Firm* — Lee Hong Degerman Kang Waimey

(57) ABSTRACT

A core network to which a cell of a base station can be connected may not be specified to be one. For example, a cell may be connected to an EPC, may be connected to a next-generation core network, or may be connected to both an EPC and a next-generation core network. The base station may transmit core network information relating to a core network to which the cell is connected, on the cell. A user (Continued)

equipment may determine whether to camp on the cell on the basis of the core network information.

8 Claims, 12 Drawing Sheets

(51) Int. Cl.

| | | |
|---|---|---|
| *H04W 48/08* | (2009.01) | |
| *H04W 48/18* | (2009.01) | |
| *H04W 76/27* | (2018.01) | |
| *H04W 76/10* | (2018.01) | |
| *H04W 48/12* | (2009.01) | |
| *H04W 88/10* | (2009.01) | |

(52) U.S. Cl.
CPC ............ *H04W 76/27* (2018.02); *H04W 48/12* (2013.01); *H04W 88/10* (2013.01)

(56) References Cited

U.S. PATENT DOCUMENTS

| | | | |
|---|---|---|---|
| 2007/0161373 A1 | 7/2007 | Klatt | |
| 2015/0334609 A1* | 11/2015 | Waldhauser | H04W 36/0061 455/436 |
| 2018/0146404 A1* | 5/2018 | Zhang | H04W 48/12 |
| 2018/0317164 A1* | 11/2018 | Luo | H04W 36/36 |
| 2019/0342827 A1* | 11/2019 | Kim | H04W 48/18 |
| 2019/0349838 A1* | 11/2019 | Futaki | H04W 48/08 |

FOREIGN PATENT DOCUMENTS

| | | | |
|---|---|---|---|
| WO | 2009136712 | 11/2009 | |
| WO | WO-2014026830 A1 * | 2/2014 | ........ H04W 36/0083 |
| WO | 2016043369 | 3/2016 | |

OTHER PUBLICATIONS

Ericsson, "A Vision of the 5G Core: Flexibility for New Business Opportunities", Charting the Future of Innovation, vol. 93, No. 2, Feb. 2016, pp. 1-16, 19 pages.

3rd Generation Partnership Project (3GPP), "Technical Specification Group Services and System Aspects; Study on Architecture for Next Generation System (Release 14)," 3GPP TR 23.799 V0.3.0, Mar. 2016, 53 pages.

Japan Patent Office Application No. 2018-546590, Office Action dated Aug. 20, 2019, 3 pages.

NTT Docomo, Inc., "Text proposal on requirements for migration towards next generation RAT", RP-160234, 3GPP TSG-RAN #71, Mar. 2016, 3 pages.

Huawei, HiSilicon, "Solution for enhanced dedicated core network selection", S2-153595, SA WG2 Meeting #111, Oct. 2015, 8 pages.

Intel, "Solution for interworking and migration", S2-161828, SA WG2 Meeting #114, Apr. 2016, 3 pages.

LG Electronics, "Migration solution with Evolved E-UTRAN to operator with an EPC and a NextGen Core simultaneously", S2-164423, SA WG2 Meeting #116BIS, Sep. 2016, 4 pages.

European Patent Office Application Serial No. 17775851.3, Search Report dated Sep. 3, 2019, 10 pages.

* cited by examiner

FIG. 5
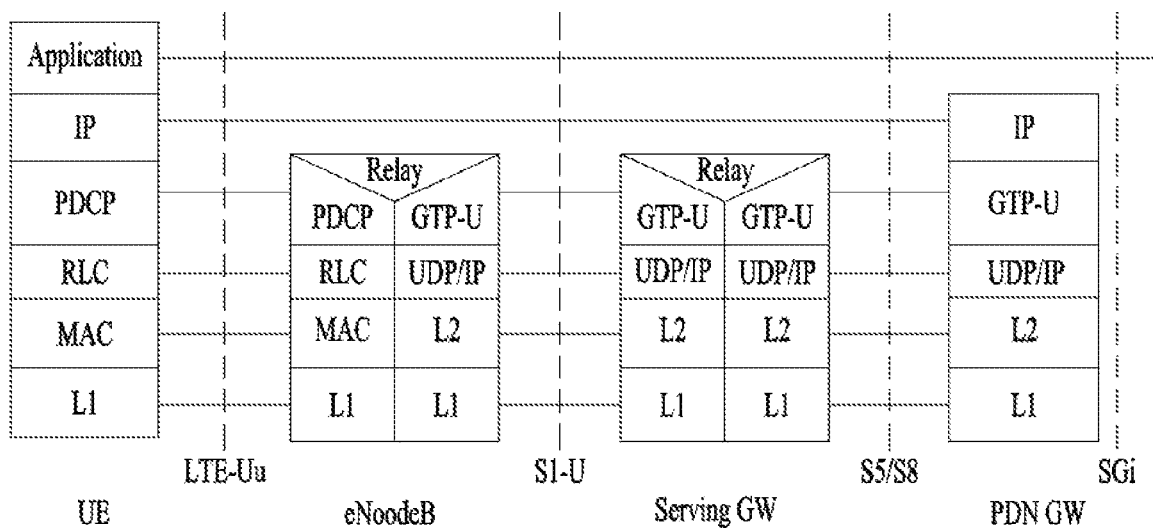
(a) UE-P-GW user plane with E-UTRAN
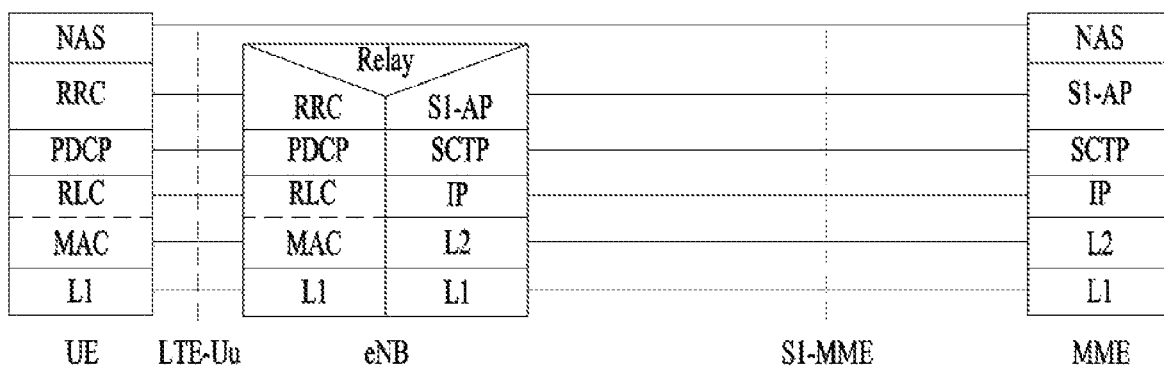
(b) Control Plane UE-MME

SYSTEM INFORMATION TRANSMISSION METHOD AND BASE STATION, AND SYSTEM INFORMATION RECEPTION METHOD AND USER EQUIPMENT

CROSS-REFERENCE TO RELATED APPLICATIONS

This application is the National Stage filing under 35 U.S.C. 371 of International Application No. PCT/KR2017/003481, filed on Mar. 30, 2017, which claims the benefit of U.S. Provisional Application No. 62/315,028, filed on Mar. 30, 2016 and 62/341,082, filed on May 25, 2016, the contents of which are all hereby incorporated by reference herein in their entirety.

TECHNICAL FIELD

The present invention relates to a wireless communication system, and more particularly, to a method of transmitting/receiving system information and apparatus therefor.

BACKGROUND ART

Wireless communication systems have been widely deployed to provide various types of communication services such as voice or data. In general, the wireless communication system corresponds to a multiple access system capable of supporting communication between multiple users by sharing available system resources (e.g., bandwidth, transmission power, etc.). For example, the multiple access system includes a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at anytime and anywhere by connecting a plurality of devices and objects to each other is one main issue to be considered in next generation communication. Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

Moreover, a method of effectively transmitting/receiving a wireless communication signal is required for a system supportive of a new radio access technology.

The technical objects that can be achieved through the present invention are not limited to what has been particularly described hereinabove and other technical objects not described herein will be more clearly understood by persons skilled in the art from the following detailed description.

Technical Solution

A core network to which a cell of a base station is connectible may not be specified as one. For example, a cell may be connected to an EPC, a next generation core network, or both of the EPC and the next generation core network. The base station may transmit, on the cell, core network information on the core network to which the cell is connected. A user equipment may determine whether to camp on the cell based on the core network information.

In one aspect of the present invention, provided is a method for a base station to transmit system information. The method comprises transmitting the system information containing core network information associated with a cell. The core network information may indicate whether a core network to which the cell is connected is an Evolved Packet Core (EPC), a Next generation Core Network (NCN), or an EPC and NCN.

In another aspect of the present invention, provided is a base station transmitting system information. The base station includes a radio frequency (RF) unit and a processor configured to control the RF unit. The processor is configured to control the RF unit to transmit the system information containing core network information associated with a cell. The core network information may indicate whether a core network to which the cell is connected is an Evolved Packet Core (EPC), a Next generation Core Network (NCN), or an EPC and NCN.

In further aspect of the present invention, provided is a method for a user equipment to receive system information from a base station. The method may comprise performing a cell search; receiving the system information on a found cell; if the user equipment supports a core network to which the cell is connected based on core network information contained in the system information, camping on the found cell, and otherwise, searching for another cell. The core network information may indicate whether the core network to which the cell is connected is an Evolved Packet Core (EPC), a Next generation Core Network (NCN), or an EPC and NCN.

In another further aspect of the present invention, provided is a user equipment receiving system information from a base station. The user equipment includes a radio frequency (RF) unit and a processor configured to control the RF unit. The processor may be configured to: control the RF unit to perform a cell search; control the RF unit to receive the system information on a found cell; if the user equipment supports a core network to which the cell is connected based on core network information contained in the system information, camp on the found cell, and otherwise, search for another cell. The core network information may indicate whether the core network to which the cell is connected is an Evolved Packet Core (EPC), a Next generation Core Network (NCN), or an EPC and NCN.

In each aspect of the present invention, the base station may be a base station of Evolved Universal Terrestrial Radio Access Network (E-UTRAN) or a base station of Next Generation Radio Access Network (NG RAN).

In each aspect of the present invention, the base station may establish a Radio Resource Control (RRC) connection with a user equipment supportive of a core network to which the cell is connected, receive uplink data on the cell from the user equipment, and forward the uplink data to the core network to which the cell is connected.

In each aspect of the present invention, if the user equipment supports the core network to which the found cell is connected and has uplink data to transmit, the user equipment may establish a Radio Resource Control (RRC) connection with the base station and transmit the uplink data on the found cell.

In each aspect of the present invention, the system information may include Non-Access Stratum (NAS) information for the cell. The NAS protocol information may indicate an EPC-based NAS or a next generation NAS.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to the present invention, a wireless communication signal of a new system can be transmitted/received while compatibility with a legacy system is maintained.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a diagram illustrating LTE (Long Term Evolution) protocol stacks for a user plane and a control plane.

MODE FOR CARRYING OUT THE INVENTION

Figure 1:
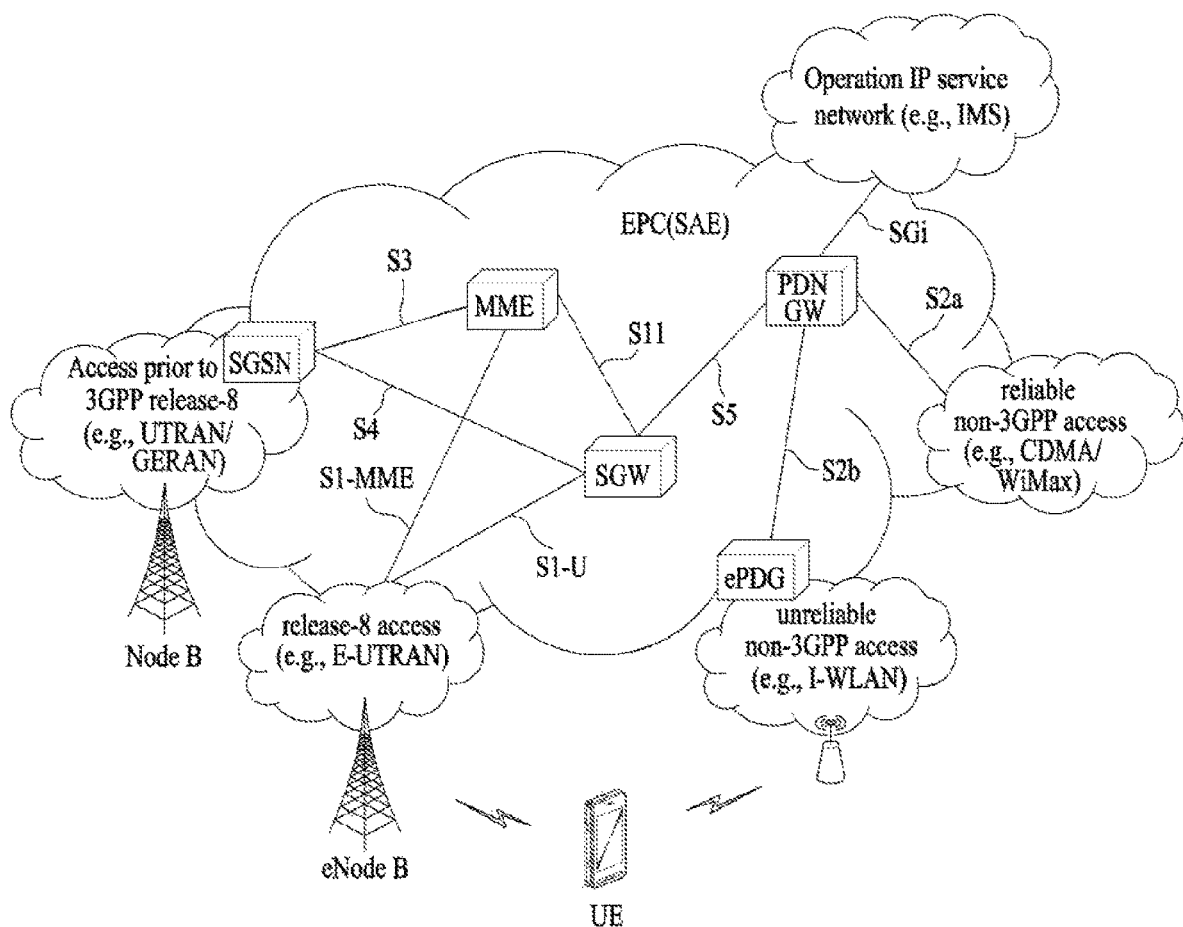
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.401, 3GPP TS 24.301, 3GPP TS 23.228, 3GPP TS 29.228, 3GPP TS 23.218, 3GPP TS 22.011, 3GPP TS 36.413, and 3GPP TR 23.799 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

UTRAN (Universal Terrestrial Radio Access Network): UMTS radio access network supportive of Wideband Code Division Multiple Access (W-CDMA). This refers to a network architecture located between a UE and a core network. Generally, UTRAN is extended from a legacy GSM radio access network and referred to as a 3G network.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMTS.

E-UTRAN (Evolved UTRAN): As a part of the 3GPP LTE physical layer standard, a network architecture defined for an E-UTRA radio interface that is a radio interface of 3GPP LTE.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an S1 signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

Cell as radio resources: the 3GPP LTE/LTE-A system uses the concept of a cell in order to manage radio resources and a cell associated with the radio resources is distinguished from a cell of a geographic region. The "cell" associated with the radio resources is defined by combination of downlink resources and uplink resources, that is, combination of DL carrier and UL carrier. The cell may be configured by downlink resources only, or may be configured by downlink resources and uplink resources. If carrier aggregation is supported, linkage between a carrier frequency of the downlink resources and a carrier frequency of the uplink resources may be indicated by system information. The carrier frequency means a center frequency of each cell or carrier. A cell operating on a primary frequency may be referred to as a primary cell (Pcell) and a cell operating on a secondary frequency may be referred to as a secondary cell (Scell). A Scell means a cell that may be configured after completion of radio resource control (RRC) connection establishment and used to provide additional radio resources. The Scell may form a set of serving cells for the UE together with the Pcell in accordance with capabilities of the UE. Although the UE is in RRC-CONNECTED state, if it is not configured by carrier aggregation or the UE does not support carrier aggregation, a single serving cell configured by the Pcell only exists. A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. In case of Time Division Duplex (TDD) system, a frequency of UL resource may be equal to that of a DL resource.

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
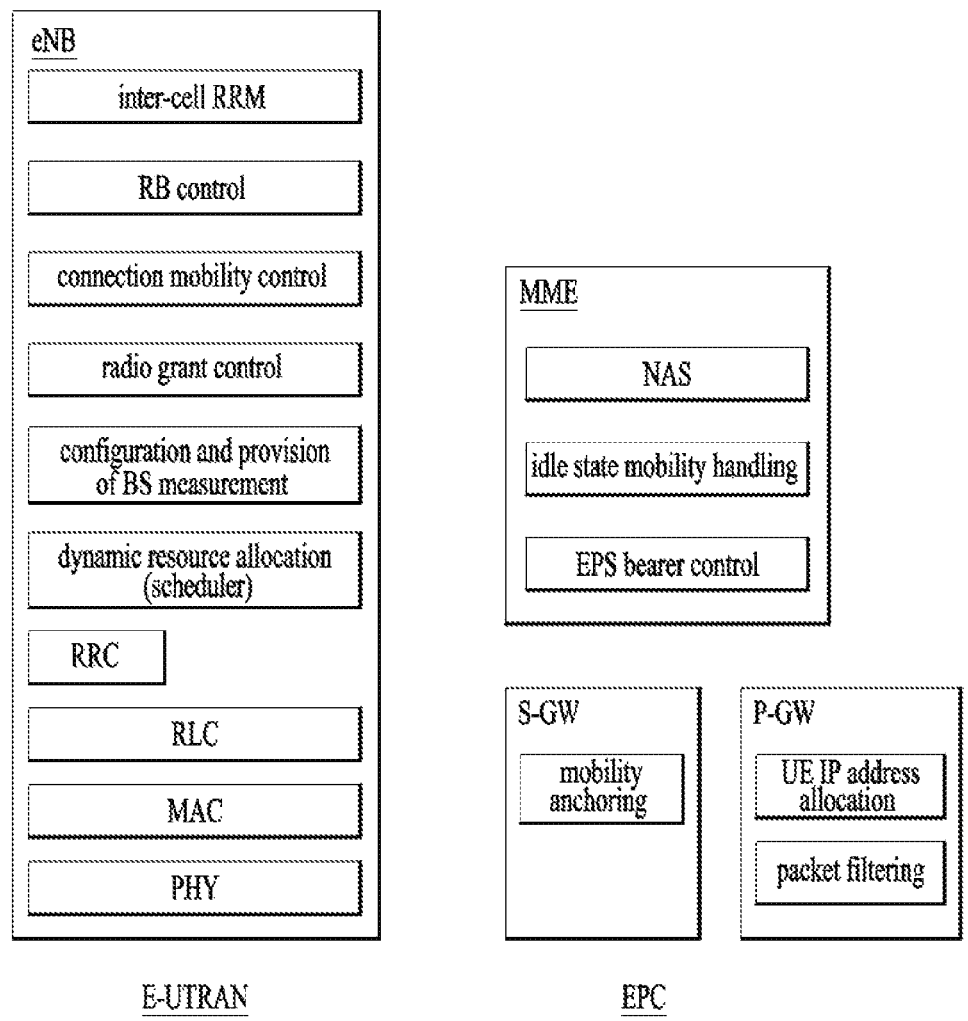
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
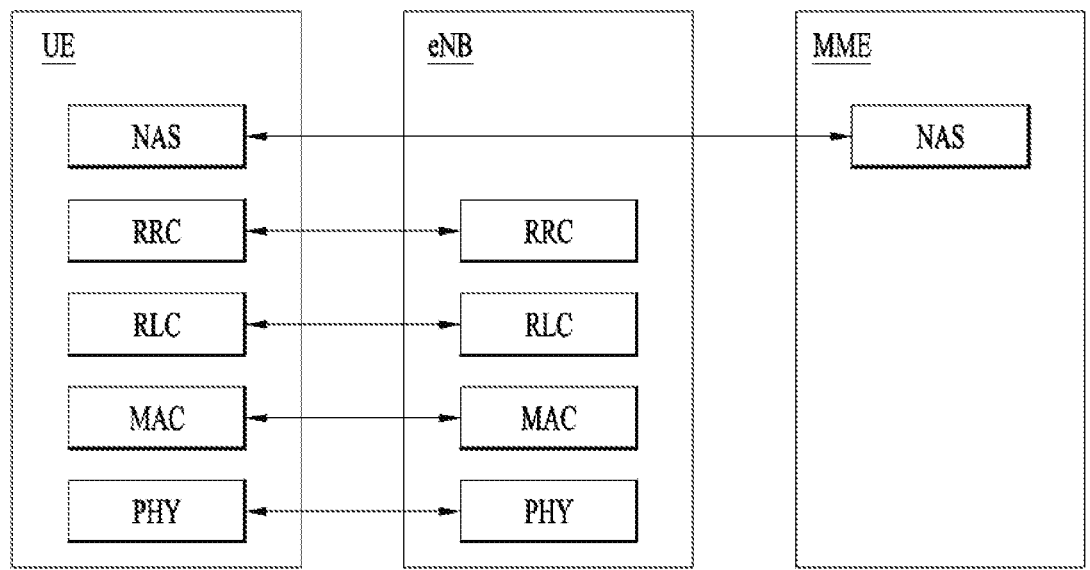
FIG. 3 is a diagram exemplarily illustrating the structure of a radio interface protocol in a control plane.
Figure 4:
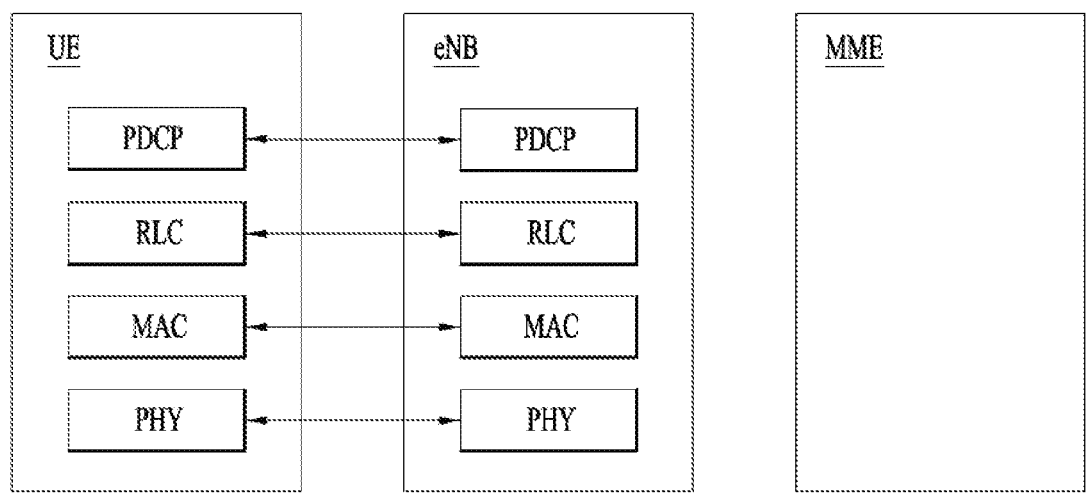
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

Camping on a cell shall be described in detail as follows. If a power is turned on or a UE intends to access a cell newly, the UE performs an initial cell search procedure in a manner of obtaining time and frequency synchronization with the cell, detecting a physical layer cell identity of the cell, etc. To this end, the UE may receive a downlink (DL) synchronization signal from an eNB to perform DL synchronization with the eNB and to obtain information such as a cell identity (ID) and the like. If the UE is switched on, a PLMN is selected by an NAS. For the selected PLMN, associated RAT(s) may have been set. The NAS provides a list of equivalent PLMNs an Access Stratum (AS) uses for cell selection and cell reselection if available. With the cell selection, the UE searches for a suitable cell of a selected PLMN, selects a service that will provide available services, and tunes to a control channel of the cell. Such a choosing is referred to as 'camping on the cell'. If the UE discovers a more suitable cell according to cell reselection criteria, the UE reselects the cell and camps on the reselected cell. If the new cell does not belong to at least one tracking area at which the UE is registered, a location registration is performed. In idle mode, there may be five kinds of purposes of camping on a cell as follows:

a) A UE is enabled to receive system information from the PLMN.

b) When a UE is registered and desires to establish an RRC connection, the UE can perform it by initially accessing a network on a control channel on which the UE camps.

c) If a PLMN receives a call for a registered UE, the PLMN may be aware of a set of tracking areas a UE camps (in most cases). If so, the PLMN may send a 'paging' message for the UE on control channels of all cells within sets of such tracking areas. Since the UE tunes to a control channel of a cell in one of registered tracking areas, a UE will receive the paging message and the may respond on the control channel.

d) A UE is enabled to receive Earthquake and Tsunami Warning System (ETWS) and Commercial Mobile Alert System) notifications.

e) A UE is enabled to receive an MBMS service.

Once camping on a cell, a UE searches for a better cell regularly according to the cell reselection criteria. If the better cell is found, it is selected. A change of a cell may imply a change of RAT. In case of a normal service, a UE camps on a suitable cell and then tunes to a control channel of the corresponding cell so as to perform the followings:

receiving system information from PLMN; and
    receiving registration region information (e.g., tracking area information) from the PLMN; and
    receiving other AS and NAS information; and
if registered:
    receiving paging and notification messages from the PLMN; and
    initiating a transfer to a connecting mode.

In the present invention, 'barred cell' means a cell that does not allow a UE to camp on. 'Camped on a cell' means that a UE has chosen a cell after completing a cell selection/reselection process. If camping on a cell, a UE monitors system information and paging information (in most cases) on the corresponding cell. 'Camped on any cell' means that a UE is in idle mode, completes a cell selection/reselection process, and selects a cell irrespective of a PLMN identifier. Besides, a cell on which a UE camped is called a serving cell.

The non-access stratum (NAS) layer positioned over the RRC layer performs functions such as session management and mobility management.

Hereinafter, the NAS layer shown in FIG. 3 will be described in detail.

The ESM (EPS Session Management) belonging to the NAS layer performs functions such as default bearer management and dedicated bearer management to control a UE to use a PS service from a network. A default bearer resource is characterized in being allocated by a network when a UE performs an initial access to a specific Packet Data Network (PDN). In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
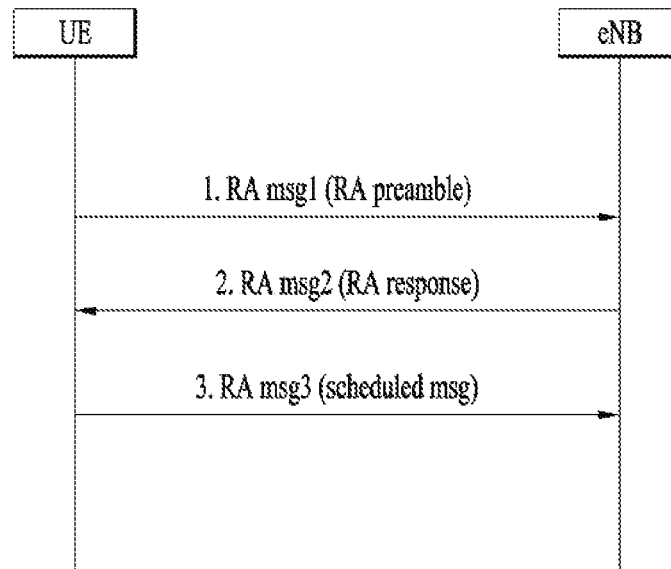
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
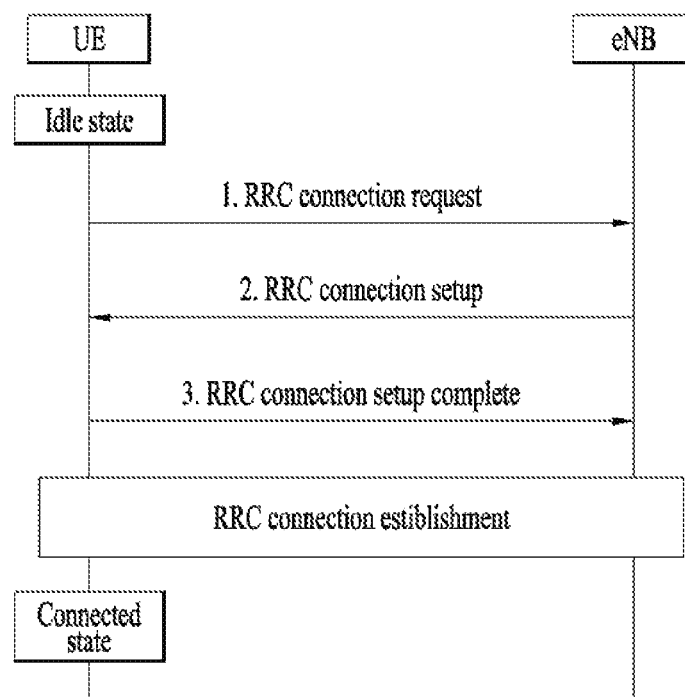
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.
2. Upon receiving the RRC connection request message from the UE, the eNB accepts the RRC connection request of the UE when the radio resources are sufficient, and then transmits an RRC connection setup message, which is a response message, to the UE.
3. Upon receiving the RRC connection setup message, the UE transmits an RRC connection setup complete message to the eNB.

As new traffic is generated, a service request procedure is performed in order for a UE in idle state to enter an active state in which traffic transmission/reception is possible. In a state that S1 connection is released due to traffic deactivation and a radio resource is not allocated despite that the UE is registered at a network, i.e., when the UE is in ECM-Idle state despite being in EMM-Registered state, if traffic supposed to be transmitted by the UE or traffic supposed to be transmitted from the network to the UE is generated, the UE makes a request for a service to the network. If the service request procedure is successfully completed, the UE enters an ECM-Connected state and then transmits/receives traffic by configuring an ECM connection (RRC connection+S1 signaling connection) in a control plane and E-RAB (DRB and S1 bearer) in a user plane. If the network intends to transmit traffic to a UE in ECM-Idle state, the network first informs the UE of a presence of the traffic supposed to be transmitted to the UE using a paging message, thereby enabling the UE to make a service request.

In some implementations, a UE from which traffic to be transmitted is generated sends an RRC connection request to an eNB through a random access procedure including the steps 1) to 3) shown in FIG. 7. If the eNB accepts the RRC connection request, the eNB sends an RRC connection setup message to the UE. Having received the RRC connection setup message, the UE sends an RRC connection setup complete message to the eNB in a manner of loading a service request on the RRC connection setup complete message. Details of a UE trigger service request procedure may refer to Section 5.3.4.1 of 3GPP TS 23.401 Document.

Figure 8:
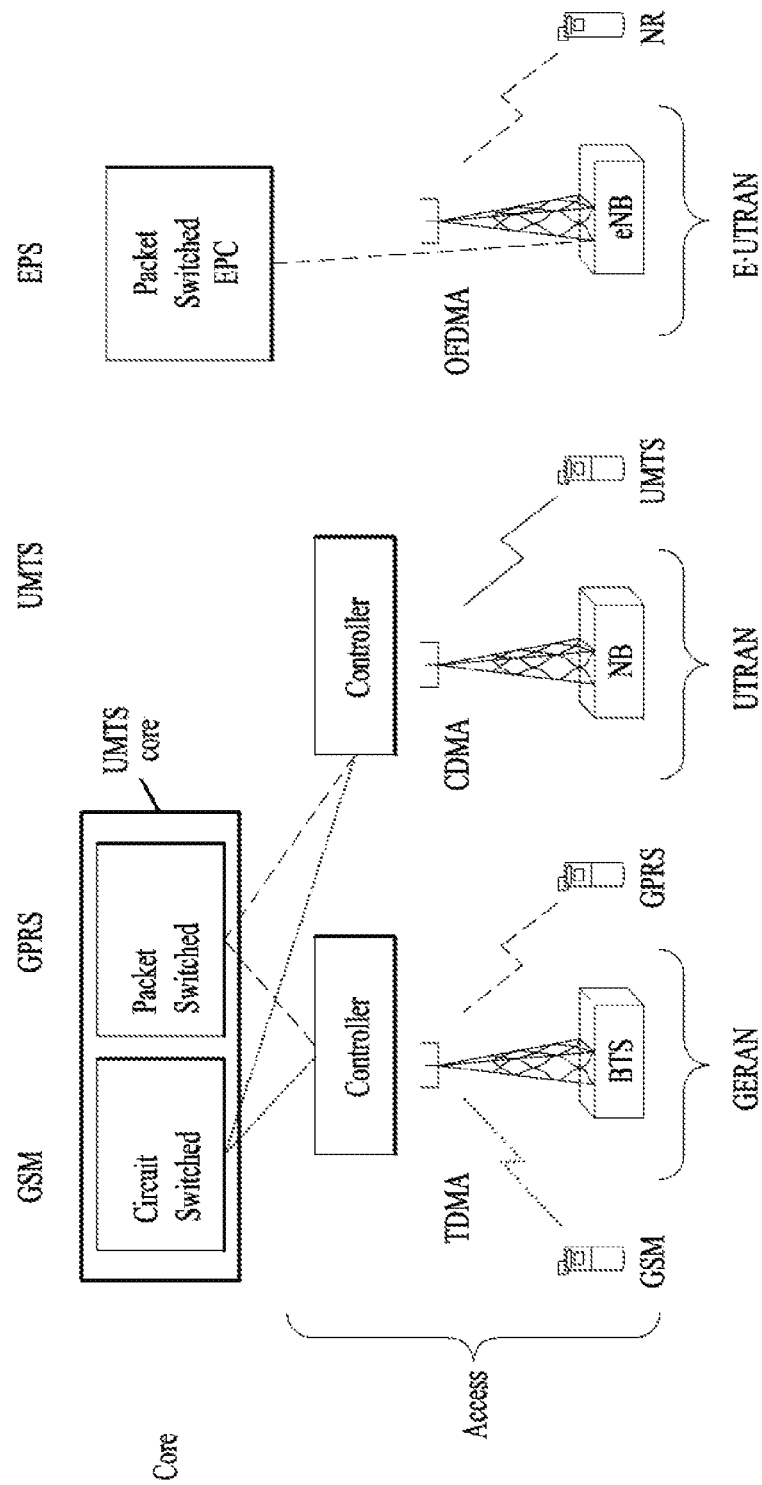
FIG. 8 shows network solutions for GSM to LTE.

FIG. 8 shows network solutions for GSM to LTE.

A GSM was developed to carry a real-time service in a real-time circuit switched manner (dotted line in FIG. 8), and provides a data service enabled through a circuit switched modem connection at a very low rate only. A first step toward an IP based packet switched solution (broken line in FIG. 8) is evolved into GPRS from GSM using Time Division Multiple Access (TDMA) that is the same radio interface and access method.

In order to achieve a higher data rate in Universal Mobile Terrestrial System (UMTS), a new access technique, Wideband Code Division Multiple Access (WCDMA) has been developed. An access network of UMTS emulates a circuit switched connection for a real-time service and a packet switched connection for Datacom (solid line in FIG. 8). To this end, a part in charge of a Circuit Switched (CS) and a part in charge of a packet switched are distinguished from each other in a UMTS core connected to UNTRAN. In UMTS, an IP address is assigned to a UE when a Datacom service is established. The IP address is released when the service is released. An incoming Datacom service still depends on a circuit switched core for paging.

EPS is purely IP-based. A real-time service and a Datacom service are carried by an IP protocol. An IP address is assigned when a mobile is switched on. The IP address is released when the switch is off.

A new access solution, LTE is based on Orthogonal Frequency Division Multiple Access (OFDMA) and is able to achieve a high data rate by being combined with spatial multiplexing (up to 4*4) at high-degree modulation (up to 16 QAM) and in downlink. A highest theoretical peak rate on a transport channel is 75 Mbps in uplink or may become 300 Mbps in downlink if using spatial multiplexing.

Thus, although the wireless communication technology has been developed up to LTE based on TDMA/WCDMA, the ongoing demands and expectations of users and service providers are increasing consistently. Moreover, since other radio access technologies continue to be developed, the new technology needs to be evolved for the competition in the future. Reduced cost per bit, increased service availability, flexible use of frequency bands, simple architecture and open interface, and adequate power consumption of UEs and the like are required. Accordingly, standardization work is underway to provide better mobile communication services in preparation for the EPS system based on the current LTE and EPC. In the following, the core network of the next-generation mobile communication system is referred to as Next Core Network (NCN) and a radio access network and associated radio access technology is referred to as Next Radio (NR). In addition, the next generation radio access network is called NGRAN, N-RAN, new RAN, or next RAN. In the present invention, NCN may be also referred to as NextGen Core, NG Core Network (CN), 5G CN, or N—CH. In addition, a base station of E-UTRAN is named eNB and a base station of NextGen is named gNB. In the following, the term 'LTE' can be used in the same sense as the radio access technology (E-UTRA) or the radio access network (E-UTRAN). In the following, supporting LTE cells may mean supporting an LTE AS layer protocol and also mean searching for LTE cells. Supporting NR cells may mean supporting a new RAT, i.e., a new AS-layer protocol, and it could mean searching for NR cells. Supporting EPC may mean supporting LTE NAS protocol, while supporting NCN may mean supporting NextGen's NAS protocol.

Figure 9:
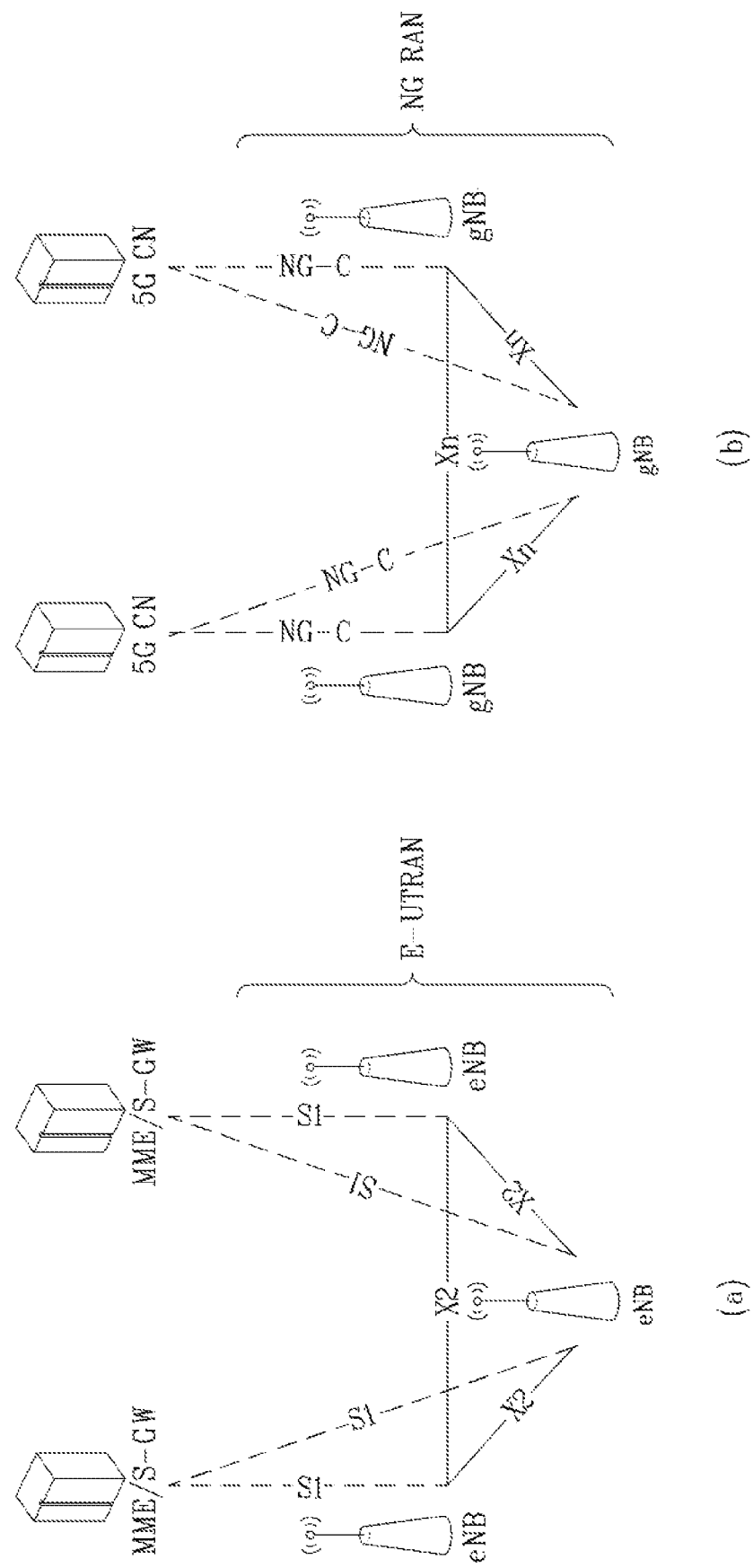
FIG. 9 exemplarily shows the E-UTRAN architecture and the Next Generation Radio Access Network (NG RAN) architecture.

FIG. 9 exemplarily shows the E-UTRAN architecture and the Next Generation Radio Access Network (NG RAN) architecture.

Referring to FIG. 9 (a), an E-UTRAN includes eNBs providing E-UTRA user plane (PDCP/RLC/MAC/PHY) user plane and control plane (RRC) protocol terminations toward a UE. The eNBs are interconnected to each other through X2 interfaces. Each of the eNBs is connected to an Evolved Packet Core (EPC) through an S1 interface, and more particularly, to an MME and a Serving Gateway (S-GW) via an S1-MME interface and an S1-U interface, respectively. The S1 interface supports many-to-many relationship between the MMEs/S-GWs and the eNBs.

Referring to FIG. 9 (b), an interface for allowing interconnection between gNBs is referred to as an Xn interface. An NG-C is a control plane interface used on NG2 reference points between a new RAN and a 5G CN. The new RAN includes gNBs providing NR user plane and control plane protocol terminations toward a UE.

The next generation mobile communication system is expected to support the two kinds of network configurations as follows.

A (mainly new) mobile communication service provider configures a network using NR and NCN only.

A (mainly legacy) mobile communication service provider additionally installs a network using NR and NCN in addition while continuing to use an EPC and LTE based network.

In viewpoint of a mobile communication service provider currently running a business by installing an EPC and LTE network, it is difficult to replace all equipments with NR/NCN based equipments at a time in the following aspect.

Installation of new networks requires significant cost.

It is unable to expect the simultaneous replacement with the NR-based UE by the existing LTE-based service subscribers.

The existing network equipment cannot be torn down at once.

Network stabilization and testing cannot be performed if the network is replaced at once.

Accordingly, service providers with EPC and LTE networks will want to gradually upgrade their networks from LTE-based to NR-based, or continue to operate both LTE and NR networks simultaneously. Alternatively, an LTE cell may be used in a manner of being connected to an EPC and a 5G CN by preferentially changing the EPC into the 5G CN.

In addition, LTE technology already covers almost all areas, but the transmission speed is slower than that of NR. On the other hand, NR partially covers an area but has a transmission speed faster than that of LTE.

Hence, the demand for a method of providing a service to a new UE stably at the beginning of the NR/NCN introduction and also providing an optimal communication service is rising.

Figure 10:
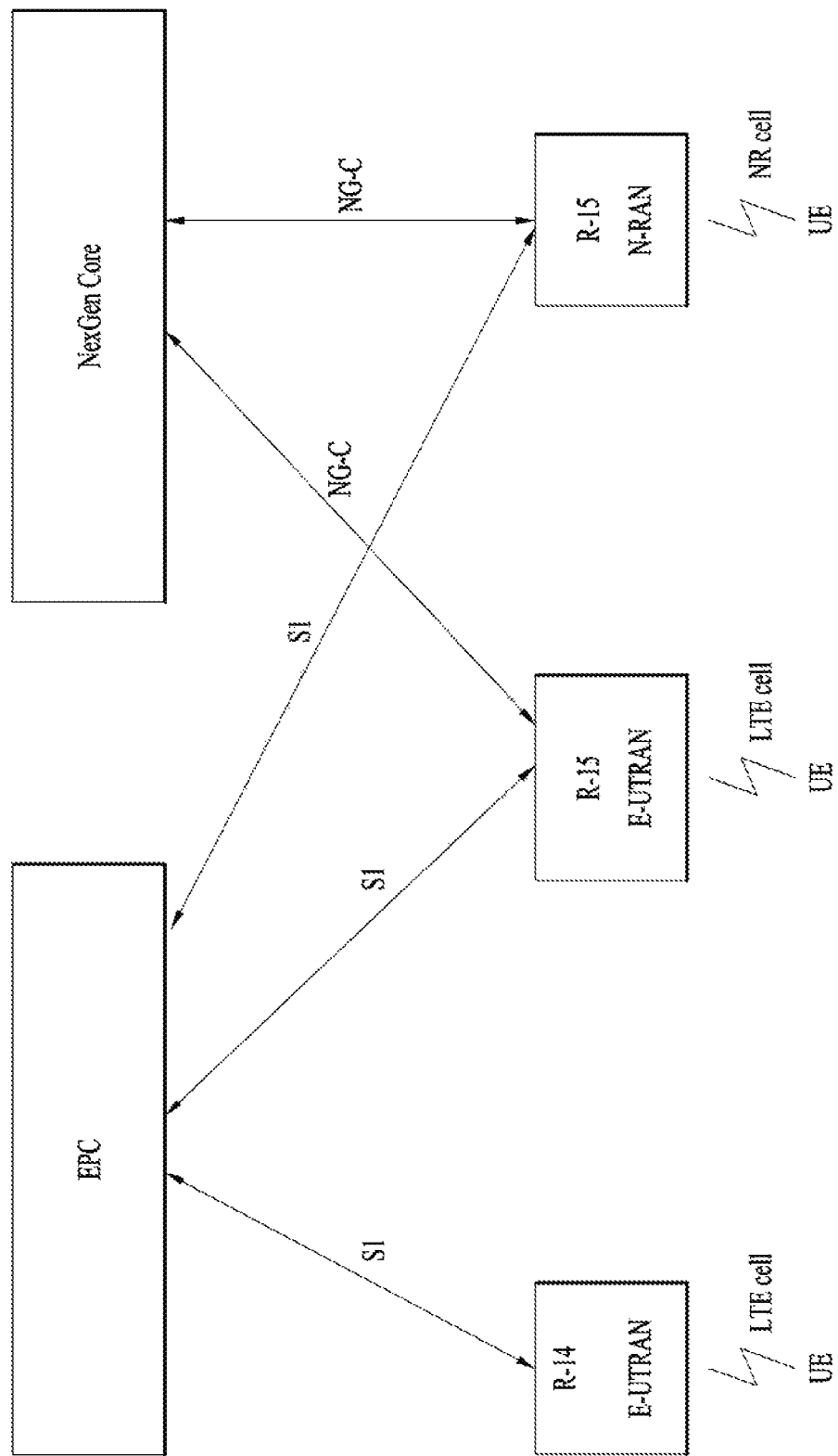
FIG. 10 exemplarily shows connection scenarios between radio access networks and core networks, which may occur according to the next generation system introduction.

FIG. 10 exemplarily shows connection scenarios between radio access networks and core networks, which may occur according to the next generation system introduction. In FIG. 10, R-14 E-UTRAN represents E-UTRAN supporting up to 3GPP Release-14, R-15 E-UTRAN represents E-UTRAN supporting up to 3GPP Release-15, and R-15 N-RAN represents a radio access network of the next generation system.

For service providers intending to provide a 5G based communication service in addition to the 4G based communication suing EPC and E-UTRAN, the following scenarios are possible.

Scenario 1: In addition, first add a gNB and link it to an EPC.

Scenario 2: In addition, first add a 5G CN (i.e. NCN) and connect an eNB to the 5G CN.

As observed from FIG. 8, in the related art, a message of a UE having attempted an access in a 3G cell is always sent to a 3G UMTS core network, and a message of a UE having attempted an access in a 4G LTE cell is always sent to an EPC. A CS and PS in a UMTS core use the same generation NAS protocol, and both of the CS and the PS use NAS messages of 3GPP TS 24.008 and RRC messages of 3GPP TS 25.331. In other words, in the related art, a cell is connected to a core network of the same generation as a radio access technology applied to the cell. Applying the related art network connectivity aspects to an EPC and an NG CN, a message of a UE having attempted an access in an LTE cell will always be sent to the EPC, and a message of a UE having attempted an access in an NR cell will always be sent to the NG CN. For example, a signal transmitted to an LTE cell by a UE according to LTE RRC technology standard will be delivered to an EPC that is a core network according to the EPC NAS technology standard of the same generation as the LTE RRC technology standard, while a signal transmitted to a 5G cell according to the 5G RRC technology standard will be delivered to a core network according to the NAS technology standard of the same generation as the 5G RRC technology standard. Yet, according to the scenario 1, a message of a UE having attempted an access to an NR cell is connected to a 5G CN. And, according to the scenario 2, a message of a UE having accessed an LTE cell is connected to an EPC.

In the existing communication system, a RAN or a Radio Access Technology (RAT) and a relevant core network technology have 1:1 relationship. For example, if a radio interface is UTRAN, a UE regards a UMTS core as always located behind the UTRAN. Yet, as described above, since various scenarios appear, the UE is unable to make the above assumption anymore. Namely, although a UE uses an LTE in a cell currently selected by the UE, a core connected to the LTE cell may include an EPC or a 5G CN. Likewise, although a UE uses an NR in a cell currently selected by the UE, a core connected to the NR cell may include an EPC or a 5G CN.

The present invention intends to propose an optimal protocol structure or an optimal interface structure, or a method for an optimal function disposition in preparation for possibility of various combinations of NR, NCN, EPC and LTE.

The present invention proposes that an NR cell sends information (hereinafter, core network information) indicating whether the NR cell is accessing an EPC, an NCN or both of the EPC and the NCN. So to speak, an eNB sends information indicating whether the eNB is connected to which core network(s) on a cell used by the eNB. If an AS protocol and an NAS protocol supported by a cell on which a UE camped match an AS protocol and an NAS protocol currently supported by the UE, the UE can send data. Otherwise, the UE searches other cells. For example, having received core network information from a cell, a UE can obtain whether a corresponding NR cell supports an EPC, an NCN or both of the EPC and the NCN. Through the core network information, each UE can determine whether the UE can stay in the corresponding NR cell.

For example, in case of a UE supporting an NR, supporting an NCN but not supporting an EPC, if it is indicated that a corresponding NR cell does not support the NCN, the UE is unable to camp on the NR cell. Or, although the UE is able to camp on the NR cell, if actual data transmission is required, the UE should move to another cell. In case of a UE supporting an NR and also supporting an EPC only, if it is indicated that a corresponding NR cell supports the EPC, the UE can camp on the NR cell. And, if actual data transmission is required, the UE can attempt an access to the NR cell through a random access procedure and the like. Or, a UE can be aware that the UE should use a prescribed procedure or protocol in attempting an access to a cell based on core network information received on the cell. For example, in case that a UE supports both an EPC NAS and an NG NAS and receives information indicating that the NG NAS is supported from a cell on which the UE camped currently, the UE performs a procedure matching the NG NAS when the UE attempts an access to the cell as (uplink) data to be transmitted is generated.

The present invention proposes an LTE cell to send information (hereinafter, core network information) indicating whether the LTE cell is accessing an EPC, an NCN or both of the EPC and the NCN. So to speak, a gNB sends information indicating whether the gNB is connected to which core network(s) on a cell used by the gNB. Having received core network information from/on the LTE cell, a UE can be aware whether the LTE cell supports an EPC, an NCN or both of the EPC and the NCN. Through the core network information, each UE can determine whether the UE can stay in the corresponding cell. For example, considering a UE supporting an NCN only while supporting an LTE without supporting an EPC, if it is indicated that a corresponding cell does not support the NCN, the UE is unable to camp on the cell. Or, although the UE is able to camp on the cell, if actual data transmission is required, the UE may need to move to another cell. If it is indicated that a cell discovered by the UE supports the NCN, the UE can camp on the cell and perform data transmission/reception if necessary.

For example, in case of a UE supporting an LTE and also supporting an EPC only, if it is indicated that a cell, on which the UE considers camping, supports the EPC, the UE camps on the cell. And, if actual data transmission is required, the UE can attempt an access in the cell. Or, a UE can be aware that the UE should use a prescribed procedure or protocol in attempting an access in a corresponding cell based on core network information. For example, in case that a UE supports both an NAS (i.e., EPC NAS) and an NG NAS and receives information indicating that a current cell supports the NG NAS, the UE performs a procedure matching the NG NAS when the UE attempts an access to the cell due to generation of (uplink) data to be transmitted. An RRC layer of a UE receives information on a type (e.g., EPC, NextGen core) of a core network supported by an LTE cell or information on an NAS protocol (EPC-based NAS or NextGen-based NAS) to use through SIB and the like from the corresponding LTE cell, and then forwards information on the received information to the NAS of the UE. Accordingly, an NAS protocol of a UE determines whether to progress an NAS procedure corresponding to an EPC or an NAS procedure corresponding to a NextGen core, and then operates correspondingly.

The above operation is similarly applicable to a UE camping on an NR cell.

Core network information and/or NAS protocol information associated with a cell may be transmitted on the cell in a manner of being contained in system information.

Figure 11:
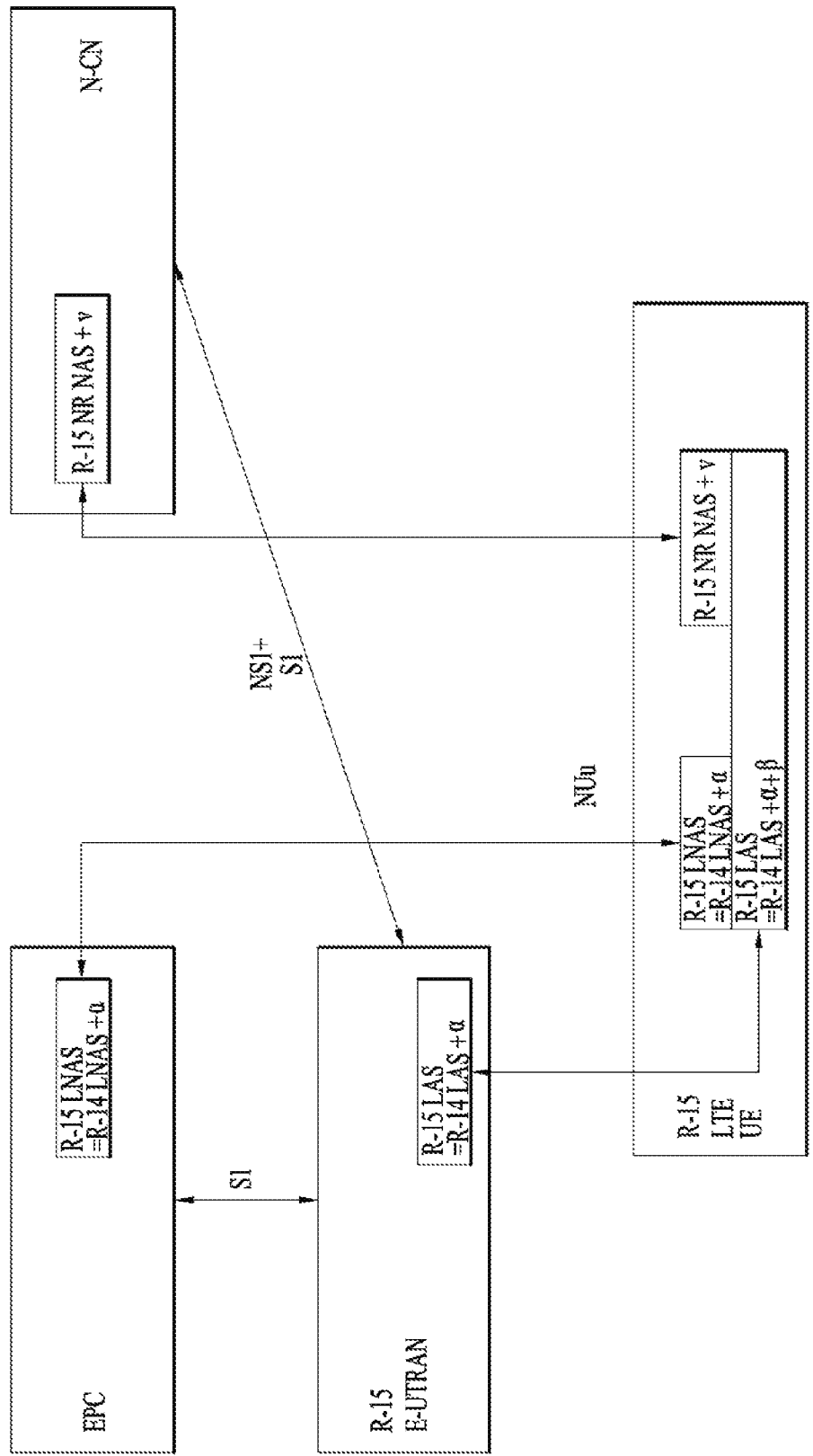
FIG. 11 exemplarily shows a connection between E-UTRAN and NCN in protocol aspect.
Figure 12:
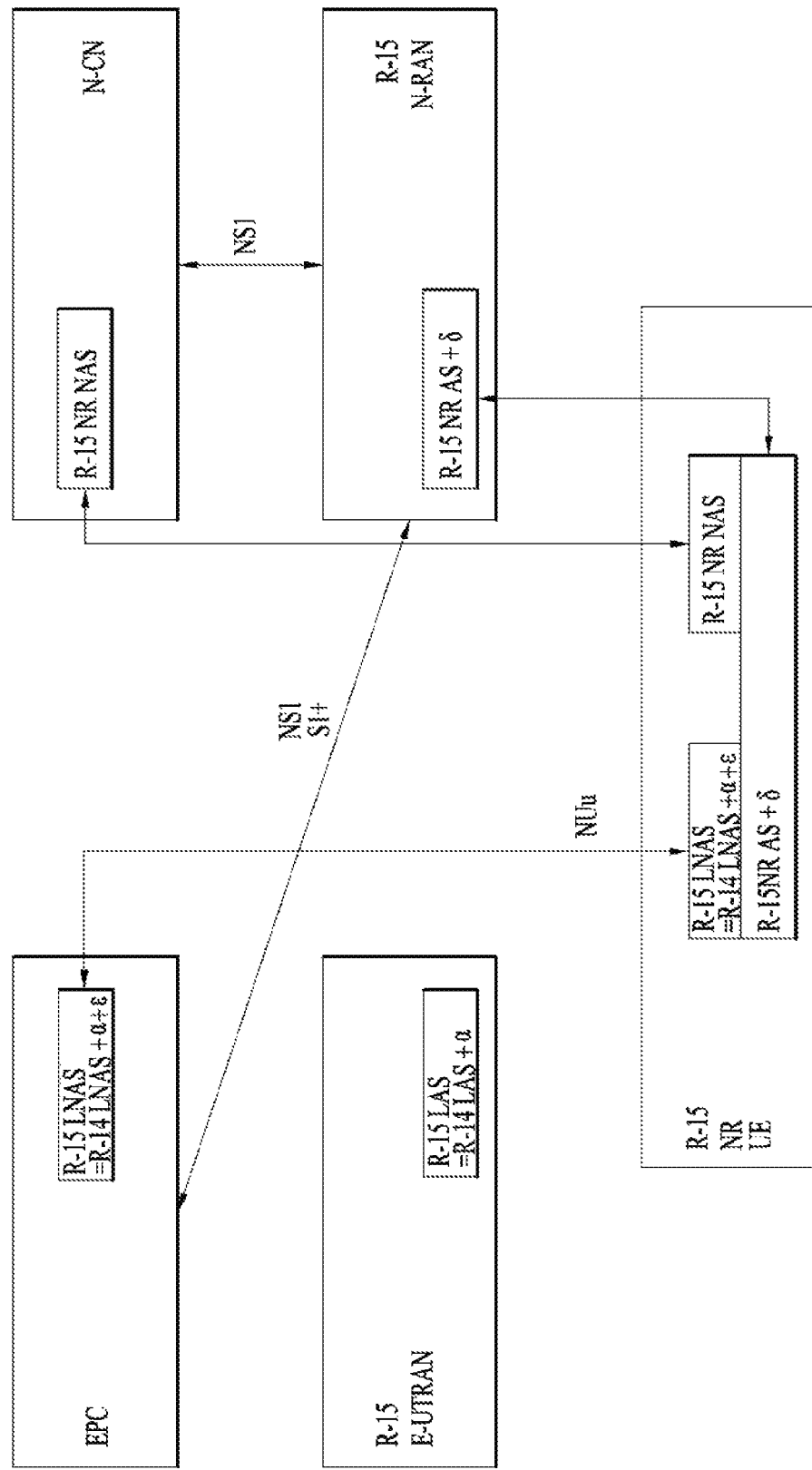
FIG. 12 exemplarily shows a connection between EPC and NG RAN in protocol aspect.

FIG. 11 exemplarily shows a connection between E-UTRAN and NCN in protocol aspect. FIG. 12 exemplarily shows a connection between EPC and NG RAN in protocol aspect. In FIG. 11 and FIG. 12, an R-15 LTE UE represents a UE capable of camping on an LTE cell according to 3GPP Release-15 (R-15), and an R-15 NR U2 represents a UE capable of camping on an LTE/NR cell supporting an NR or NCN according to 3GPP R-15. Here, R-15 is just exemplary and the present invention is applicable to a UE capable of camping on an LTE/NR cell supportive of an NR or NCN.

In case of LTE/EPC, if an NAS layer of a UE has data to transmit, the NAS layer provides an RRC with information such as an establishment cause, a call type and the like. Hence, in case that an LTE based NAS entity accesses an NR based RRC, the NR based RRC may interpret the establish cause or call type information indicated by the LTE based NAS and then convert it into a value or procedure of an NR based RRC. Such conversion information may be configured per UE by a network.

In case of LTE/EPC, if an NAS layer of a UE has data to transmit, the NAS layer provides an RRC with information such as an establishment cause, a call type and the like. Hence, in case that an LTE based NAS entity accesses an NR based RRC, the LTE based NAS may convert the establishment cause or call type information into a value understandable by the NR based RRC or to be suitable for a procedure performed by the NR based RRC and then indicate it. Such conversion information may be configured per UE by a network.

In FIG. 11 and FIG. 12, S1 indicates a related art protocol between an eNB and an MME and S1+ indicates a protocol between a gNB and an MME. Namely, S1+ is a protocol between a base station and an MME, which is partially modified based on S1. NS1 indicates a protocol between an N-RAN and an N—CN, and NS1+ indicates a protocol prepared by modifying NS1 so as to be usable between an eNB and the N—CN.

In FIG. 11 and FIG. 12, each of α, β, γ, δ and ε means an information or procedure change necessary for adaptation from a combination of LTE/EPC protocols to a combination of new protocol. For example, as exampled in the foregoing description, changing/converting call type information in 4G LTE/EPC into a call type according to 5G may become α, β, γ, δ or ε. Particularly, α indicates a part added in association with LTE/EPC in R-15 compared with R-14, β indicates a part added in association with NCN in R-15 compared with R-14, γ indicates a part added to support LTE AS in the NR NAS standard of R-15, δ indicates a part added to support EPC NAS in the R-15 NR AS standard, and ε indicates a part added to support NR AS in the R-14 EPC NAS standard.

Figure 13:
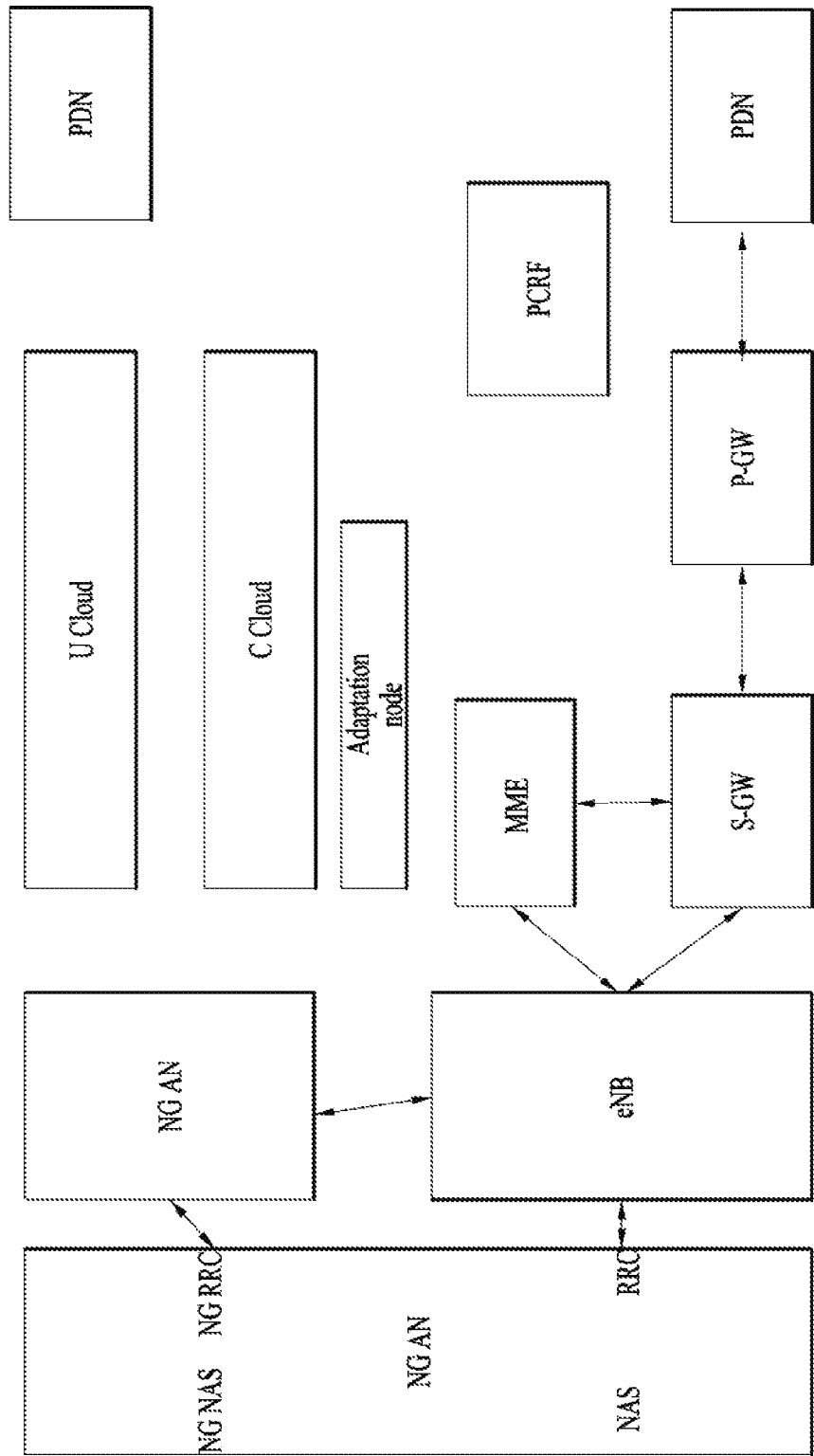
FIG. 13 exemplarily shows a method for a base station to provide a Next Generation UE (NG UE) with a data transmission service using LTE and Next Radio (NR) simultaneously.

FIG. 13 exemplarily shows a method for a base station to provide a Next Generation UE (NG UE) with a data transmission service using LTE and Next Radio (NR) simultaneously.

A UE, for which NAS (i.e., LTE NAS), RRC (i.e., LTE RRC), NG NAS and NG RRC are configured, camps on a cell of LTE in idle mode. Thereafter, if data supposed to be transmitted by the UE is generated, an RRC connection is set up using a procedure of LTE. If an LTE RRC entity of the UE enters an RRC connected mode of LTE, the LTE RRC entity of the UE informs an NG RRC entity of the UE that the LTE RRC entity has entered the connected mode. In this case, the NG RRC entity regards itself as having entered the RRC connected mode as well. If the LTE RRC connection of the UE is released, the LTE RRC entity of the UE informs the NG RRC entity that the RRC connection is released. If entering an ECM connected mode of LTE, an LTE NAS entity of the UE, i.e., an EPC NAS entity informs an NG NAS entity of the UE that the LTE NAS entity has entered the connected mode. Thereafter, the NG NAS entity can operate by regarding itself as having entered the ECM connected mode. Thereafter, if a message (e.g., signaling data) to be sent by the NG NAS entity is generated, the message is forwarded to an MME through an LTE NAS entity, i.e., an EPS NAS entity. If necessary, the MME additionally sends the received message to a C cloud of an NCN. For reference, a U cloud processes a user plane, i.e., user data on a core network only and the C cloud processes a control plane on the core network only. Compared with 4G LTE/EPC, the C cloud plays a role similar to an MME and the U cloud plays a role similar to an S-GW/P-GW.

A reverse procedure may be performed similarly. For example, if a message to be sent to the UE by the C cloud is generated, the message is preferentially forwarded to the MME. Thereafter, the MME sends the data to the NAS entity of the UE. Thereafter, the NAS of the UE can forward the data to the NG NAS entity of the UE. Regarding an NAS layer message of the EPS, information indicating whether the NAS layer message is a message for an entity of the EPS or a message for an entity belonging to an N—CN is contained in a header of the NAS layer message. Based on the information, the NAS entity can determine whether to process or forward a received message to the NG NAS entity. If a UE enters an ECM and/or RRC connected mode, information on this entry may be forwarded to a network node or protocol entity pertaining to NR/NCN. For example, if a UE enters an LTE RRC connected mode, an eNB managing the UE can inform an access network (NG AN) node (e.g., gNB) of an NR that the UE has entered an RRC connected mode. From this procedure, the eNB or MME can obtain information indicating that the UE supports the NR. For example, it is able to use information stored in a Home Subscriber Server (HSS) or the like or information the NAS of the UE sent to the MME. The eNB obtains information, which indicates that a service of a prescribed bearer or QoS should be provided to the UE, from the MME. For example, the eNB may obtain the following additional information on the UE from the MME, and operate selectively according to the obtained additional information: information indicating whether a service can be provided to the UE using the NR; and or information indicating whether the NR can be used for a prescribed bearer. The MME can obtain the information through information exchange with a node of the C cloud of the NCN. Or, the UE may camp on an NR cell instead of staying in idle mode or camping on an LTE cell.

Figure 14:
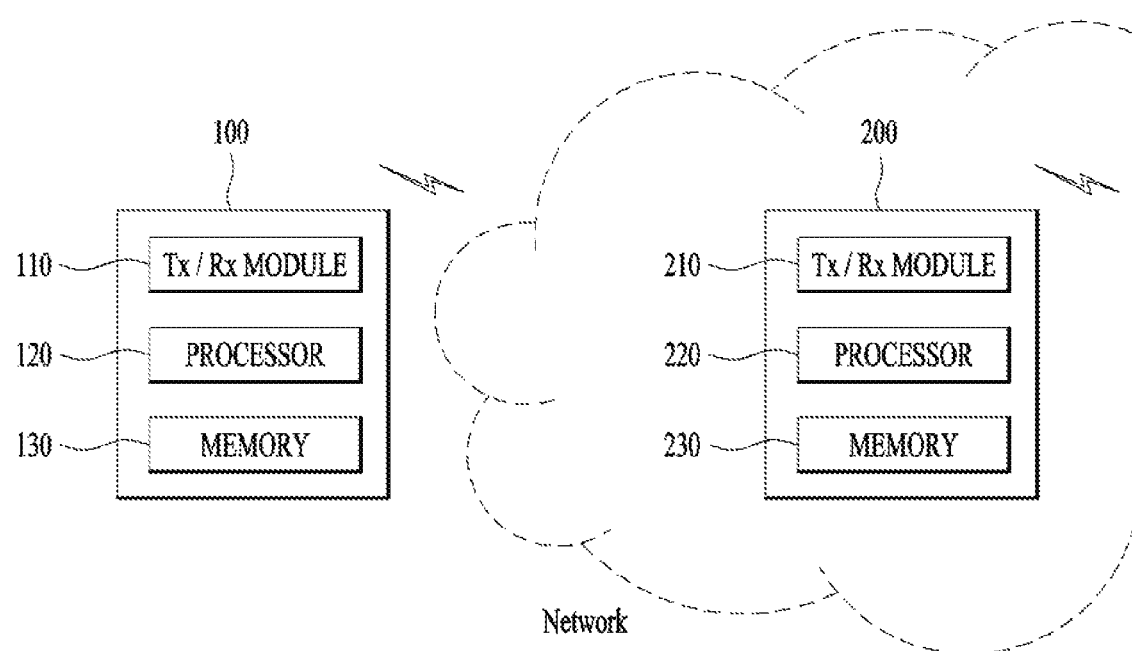
FIG. 14 illustrates a node according to an embodiment of the present invention.

FIG. 14 illustrates configuration of a UE and a network node according to a preferred embodiment of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 14, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

What is claimed is:

1. A method of receiving system information by a user equipment (UE) from a base station, the method comprising:
performing a cell search;
receiving the system information on a found cell based on the cell search,
wherein the found cell is a long term evolution (LTE) cell connected to an evolved packet core (EPC), and
wherein the system information includes core network information regarding whether the found cell is connected to a next generation core network (NCN) or not; and
based on the core network information informing that the found cell is connected to the NCN:
selecting a core network type among the EPC and the NCN; and
performing an access attempt on the found cell according to the core network type,
wherein the core network type is selected by a non-access stratum (NAS) layer of the UE.

2. The method of claim 1,
wherein the base station is a base station of evolved universal terrestrial radio access network (E-UTRAN).

3. The method of claim 1, further comprising:
based on the UE supporting the core network type to which the found cell is connected and having uplink data to transmit, establishing a radio resource control (RRC) connection with the base station; and
transmitting the uplink data on the found cell.

4. The method of claim 1,
wherein the core network information is forwarded from a radio resource control (RRC) layer of the UE to the NAS layer of the UE.

5. A user equipment (UE) for receiving system information from a base station, the UE comprising:
a transceiver, and
a processor configured to control the transceiver, the processor configured to:
perform a cell search;
control the transceiver to receive the system information on a found cell based on the cell search,
wherein the found cell is a long term evolution (LTE) cell connected to an evolved packet core (EPC), and
wherein the system information includes core network information regarding whether the found cell is connected to a next generation core network (NCN) or not; and
based on the core network information informing that the found cell is connected to the NCN:
select a core network type among the EPC and the NCN; and
perform an access attempt on the found cell according to the core network type,
wherein the core network type is selected by a non-access stratum (NAS) layer of the UE.

6. The UE of claim 5,
wherein the base station is a base station of evolved universal terrestrial radio access network (E-UTRAN).

7. The UE user equipment of claim 5,
wherein the processor is further configured to:
based on the UE supporting the core network to which the found cell is connected and having uplink data to transmit, establish a radio resource control (RRC) connection with the base station and control the transceiver to transmit the uplink data on the found cell.

8. The UE of claim 5,
wherein the core network information is forwarded from a radio resource control (RRC) layer of the UE to the NAS layer of the UE.

* * * * *